(12) United States Patent
Kitaizumi (10) Patent No.: US 8,651,559 B2
(45) Date of Patent: Feb. 18, 2014

(54) VEHICLE BODY FRONT STRUCTURE

(71) Applicant: Suzuki Motor Corporation, Hamamatsu (JP)

(72) Inventor: Toshiharu Kitaizumi, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 13/840,064

(22) Filed: Mar. 15, 2013

(65) Prior Publication Data

US 2013/0249246 A1 Sep. 26, 2013

(30) Foreign Application Priority Data

Mar. 26, 2012 (JP) ................. 2012-069998

(51) Int. Cl.
*B60R 19/18* (2006.01)

(52) U.S. Cl.
USPC ............... 296/187.09; 296/193.09; 293/102; 293/133

(58) Field of Classification Search
USPC ......... 293/102, 132, 133; 296/187.09, 193.09
See application file for complete search history.

(56) References Cited

U.S. PATENT DOCUMENTS

| 7,073,831 B2 * | 7/2006 | Evans ........................... 293/155 |
| 2009/0160204 A1 * | 6/2009 | Czopek et al. ................ 293/133 |

FOREIGN PATENT DOCUMENTS

JP 2008-74154 4/2008

* cited by examiner

*Primary Examiner* — Lori Lyjak
(74) *Attorney, Agent, or Firm* — Silicon Valley Patent Group LLP (57) ABSTRACT

A vehicle body front structure includes a pair of side members and disposed behind a front bumper; a bumper member; a clearance behind the bumper member; an absorber disposed in front of the bumper member, the absorber being configured to absorb an impact from the front of the vehicle; and an upper member disposed above the bumper member, a front end of the upper member being located, in a front-rear direction of the vehicle, slightly behind the bumper member, wherein the bumper member is formed of a single plate and forms a protrusion protruding toward the front of the vehicle.

1 Claim, 7 Drawing Sheets

VEHICLE BODY FRONT STRUCTURE

CROSS-REFERENCE TO PENDING PROVISIONAL APPLICATION

This application claims the benefit of and priority to Japanese Application No. 2012-069998 filed Mar. 26, 2012 and entitled "Vehicle Body Front Structure", which is assigned to the assignee hereof and which is incorporated herein by reference.

BACKGROUND

I. Field of the Invention

This disclosure relates to a vehicle body front structure including a front bumper installed at the front end of the body of a vehicle.

II. Background

A known example of a vehicle body front structure is configured to absorb an impact load acting from the front of the vehicle when a pedestrian collides with the body of a vehicle with an impact absorber, thus protecting the leg of the pedestrian (for example, see Japanese Patent Laid-open Publication No. 2008-74154).

Japanese Patent Laid-open Publication No. 2008-74154 discloses a vehicle body front structure including a first impact absorber. The first impact absorber includes crush cans respectively connected to the front ends of a pair of frames (corresponding to side members of the present invention) extending in the front-rear direction of a vehicle, and a beam portion disposed extending across the crush cans in the width direction of the vehicle. This vehicle body front structure is also provided with, in addition to the first impact absorber, a second impact absorber having a lower rigidity than the first impact absorber and extending below the beam portion to the vicinity of the rear face of a bumper fascia.

According to Japanese Patent Laid-open Publication No. 2008-74154, the provision of the second impact absorber in addition to the first impact absorber increases the impact load absorbency and enhances the pedestrian protection performance.

However, sufficient protection of the pedestrian's leg requires not only to simply absorb the impact load, but also to reduce loads, such as shear and bending, on the knee joint portion of the legs. That is, how the impact load is received and absorbed at the front end of the vehicle is critical to the vehicle body front structure.

It is difficult to sufficiently protect the pedestrian's leg merely by increasing the impact load absorbency as in the vehicle body front structure disclosed in Japanese Patent Laid-open Publication No. 2008-74154.

In view of the foregoing problem, it is an object of the present invention to provide a vehicle body front structure that can achieve an enhanced pedestrian protection performance.

BRIEF SUMMARY

In order to solve the above-described problems, a representative configuration of a vehicle body front structure according to the present invention includes: a front bumper installed at a front end of a body of a vehicle; a pair of side members disposed behind the front bumper spaced apart in a width direction of the vehicle and extending in a front-rear direction of the vehicle; a bumper member extending in the width direction of the vehicle and connected at both ends thereof to front ends of the pair of side members; a clearance behind the bumper member; an absorber disposed in front of the bumper member and extending in the width direction of the vehicle, the absorber being configured to absorb an impact from the front of the vehicle; and an upper member disposed above the bumper member and extending in the width direction of the vehicle, a front end of the upper member being located, in a front-rear direction of the vehicle, slightly behind the bumper member, wherein the bumper member is formed of a single plate and forms a protrusion protruding toward the front of the vehicle and extending across the width direction of the vehicle, the protrusion having a shape that is longer in an up-down direction of the vehicle than in a front-rear direction of the vehicle.

According to some embodiments, a vehicle body front structure includes: a pair of side members and disposed behind a front bumper spaced apart in a width direction of the vehicle and extending in a front-rear direction of the vehicle; a bumper member extending in the width direction of the vehicle and connected at both ends and thereof to front ends of the pair of side members; a clearance behind the bumper member; an absorber disposed in front of the bumper member and extending in the width direction of the vehicle, the absorber being configured to absorb an impact from the front of the vehicle; and an upper member disposed above the bumper member and extending in the width direction of the vehicle, a front end of the upper member being located, in a front-rear direction of the vehicle, slightly behind the bumper member, wherein the bumper member is formed of a single plate and forms a protrusion protruding toward the front of the vehicle and extending across the width direction of the vehicle, the protrusion having a shape that is longer in an up-down direction of the vehicle than in a front-rear direction of the vehicle.

The above-described configuration assumes that a pedestrian's leg facing the vehicle body collides with the vicinity of the center of the vehicle body, and thereby the front bumper has received an impact load from the front. When the front bumper receives an impact load, the single-sheet bumper member, which is located behind the front bumper and does not form a closed section, first collapses and absorbs the energy. Since the clearance is located behind the bumper member, the bumper member is deformed such that its portion in the vicinity of the vehicle center is bent backward. Furthermore, tensile force acts on the bumper member from the pair of side members connected to both end portions thereof. Thereby, the bumper member absorbs the energy resulting from the impact load and completes its deformation. Thereafter, the absorber collapses and thereby the energy is further absorbed. Further, since the front end of the upper member is located at, in a front-rear direction of the vehicle, slightly behind the bumper member, the position of the bumper member and the absorber that have collapsed as a result of absorbing energy is located further to the rear of the vehicle than the front end of the upper member in the vehicle front-rear direction. Consequently, the lower portion, bounded by the knee joint portion, of the pedestrian's leg that has collided is located further to the rear of the vehicle than the upper portion. This positional relationship makes it possible to reduce the impact on the knee joint portion. Note that the position of the upper portion, which corresponds to a thigh part of the pedestrian's leg, corresponds to the position of the upper member. The position of the lower portion, which corresponds to the crus part of the pedestrian's leg, corresponds to the position of the bumper member and the absorber.

In other words, the above-described configuration makes it possible to actively deform the bumper member, and also retract the absorber and the bumper member so as to be in an optimum positional relationship relative to the front end of the upper member. Consequently, it is possible to reduce loads on the knee joint portion of the pedestrian's leg, such as shear and bending, thus achieving an enhanced performance in protection of the pedestrian's leg. Note that the present specification does not assume that the vehicle body collides with a pedestrian facing the vehicle body, at an extreme speed (i.e., 150 km/h or 5 km/h), but assumes, as a prerequisite, that the vehicle body collides with a predetermined speed at about 20 to 40 km/h, for example.

With the present invention, it is possible to provide a vehicle body front structure that can achieve an enhanced pedestrian protection performance.

DETAILED DESCRIPTION

Hereinafter, a preferred embodiment of the present invention will be described in detail with reference to the accompanying drawings. The dimensions, materials, and other specific numerical values described in this embodiment are merely examples for facilitating the understanding of the present invention, and are not to be construed as limiting the invention unless otherwise stated. It should be noted that elements constituting substantially identical functions and configurations are denoted by identical reference numerals in the present specification and the drawings, and hence redundant description has been omitted. Also, illustration of elements that are not directly relevant to the present invention has been omitted.

Figure 1:
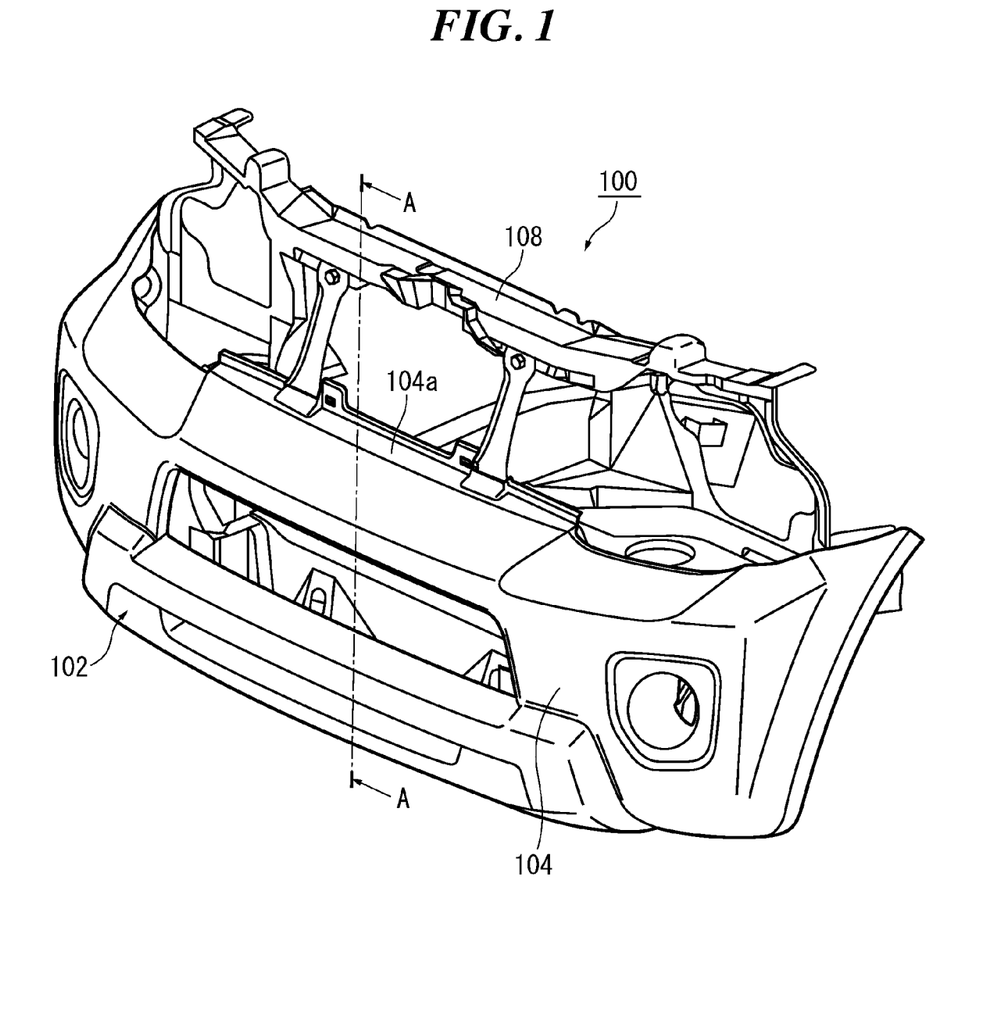
FIG. 1 is a diagram schematically showing a configuration of a vehicle body front structure according to an embodiment of the invention.
Figure 2:
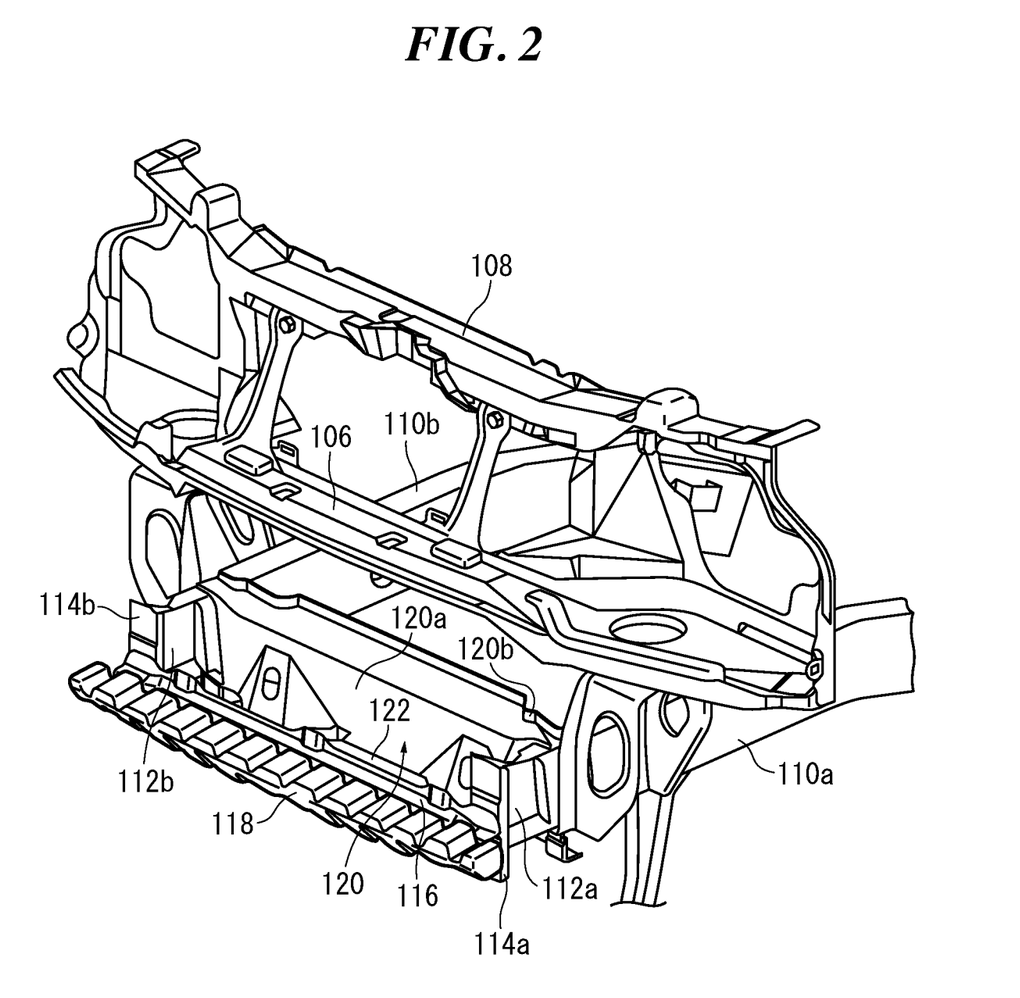
FIG. 2 is a diagram showing the vehicle body front structure shown in FIG. 1, with a front bumper being removed.
Figure 3A:
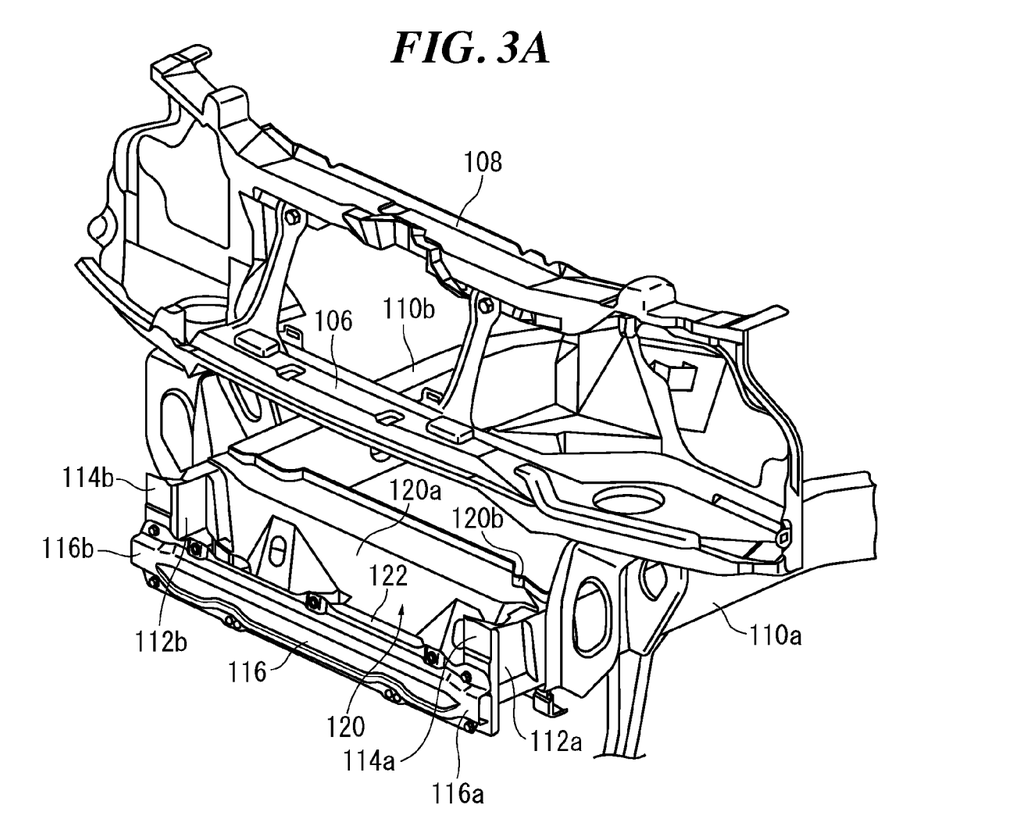
FIGS. 3A and 3B are diagrams showing the vehicle body front structure shown in FIG. 2, with an absorber being removed.
Figure 3B:
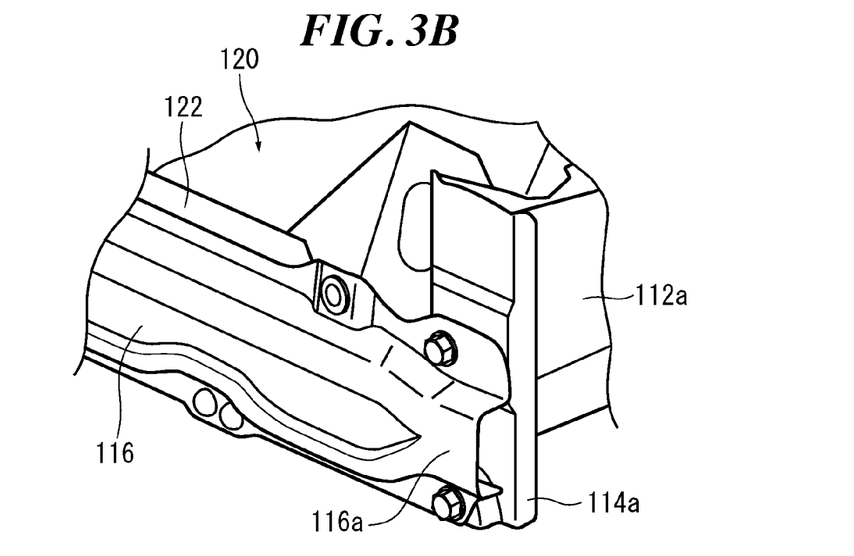

FIG. 1 is a diagram schematically showing a configuration of a vehicle body front structure according to an embodiment of the invention. FIG. 2 is a diagram showing the vehicle body front structure shown in FIG. 1, with a front bumper being removed. FIGS. 3A and 3B are diagrams showing the vehicle body front structure shown in FIG. 2, with an absorber being removed. FIG. 3A is a diagram schematically showing a configuration of the vehicle body front structure on the vehicle front side.

FIG. 3B is a partial enlarged view of FIG. 3A.

As shown in FIG. 1, a vehicle body front structure 100 includes a front bumper 102 installed at the front end of the body of a vehicle. The front bumper 102 includes a bumper fascia 104 serving as the outer jacket. A top portion 104a of the bumper fascia 104 is disposed along an upper member 106, which is shown in FIGS. 2A, 2B and 3A, extending in the width direction of the vehicle. Also, disposed on the vehicle upper side of the upper member 106 is a hood member 108 extending in the vehicle width direction and supporting a hood (not shown).

As shown in FIG. 2, the vehicle body front structure 100 includes a pair of side members 110a and 110b extending in the vehicle front-rear direction, a pair of crush cans 112a and 112b, a pair of support members 114a and 114b, a bumper member 116, an absorber 118 and a cross member 120, in addition to the members described above.

The crush cans 112a and 112b are impact absorbing members extending in the vehicle front-rear direction and connected to the front ends of the side members 110a and 110b, respectively. The support members 114a and 114b are members connected to the front ends of the crush cans 112a and 112b, respectively, and support the bumper member 116 as shown in FIG. 3A As shown in FIG. 3A, the bumper member 116 extends in the vehicle width direction and both ends 116a and 116b thereof are connected to the support members 114a and 114b, respectively. Also, the bumper member 116 is a member formed of a single plate of metal, for example, and has a shape open toward the rear of the vehicle without forming a closed section as shown at the end 116a of FIG. 3B. The absorber 118 is a member extending in the vehicle width direction as shown in FIG. 2, is disposed on the vehicle front side of the bumper member 116, and absorbs impacts from the front of the vehicle.

The cross member 120 is a member extending in the vehicle width direction and is located behind the bumper member 116. As shown in FIGS. 2A, 2B, 3A and 3B, a clearance 122 is interposed between the bumper member 116 and the cross member 120. As shown in FIGS. 2A, 2B and 3A, the cross member 120 includes a cross member first front located on the vehicle front side (hereinafter, referred to as "front side-cross member 120a") and a cross member first rear located on the vehicle rear side (hereinafter, referred to as "rear side-cross member 120b). Note that the front side-cross member 120a and the rear side-cross member 120b together form a closed section.

Figure 4A:
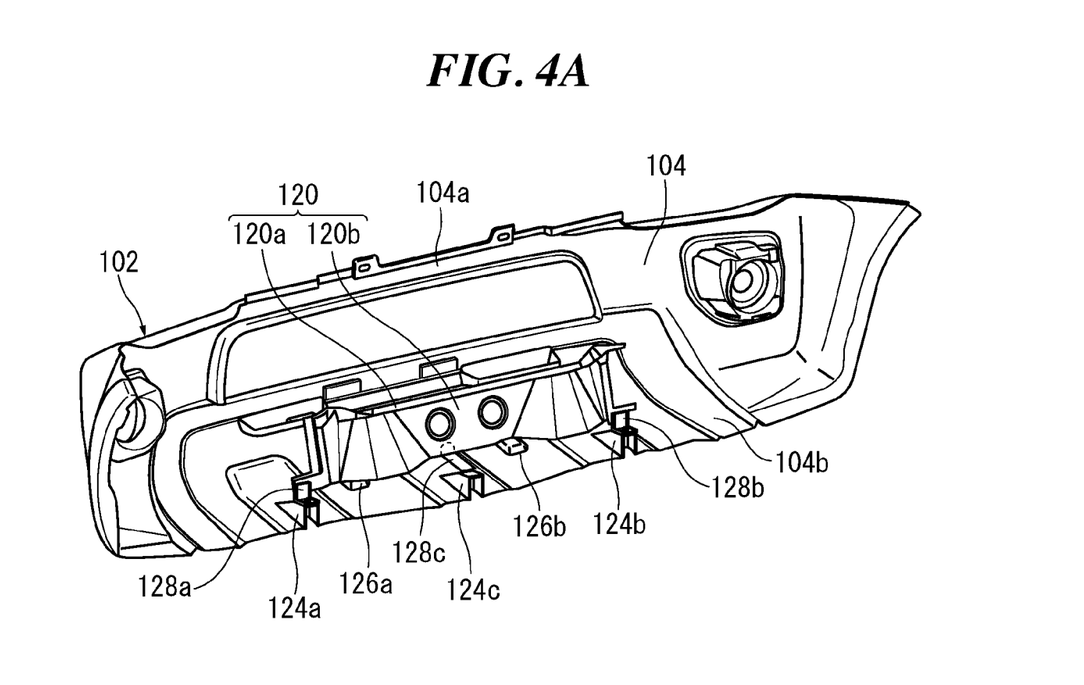
FIGS. 4A and 4B are diagrams showing part of the vehicle body front structure shown in FIG. 1, as viewed from above on the vehicle rear side.
Figure 4B:
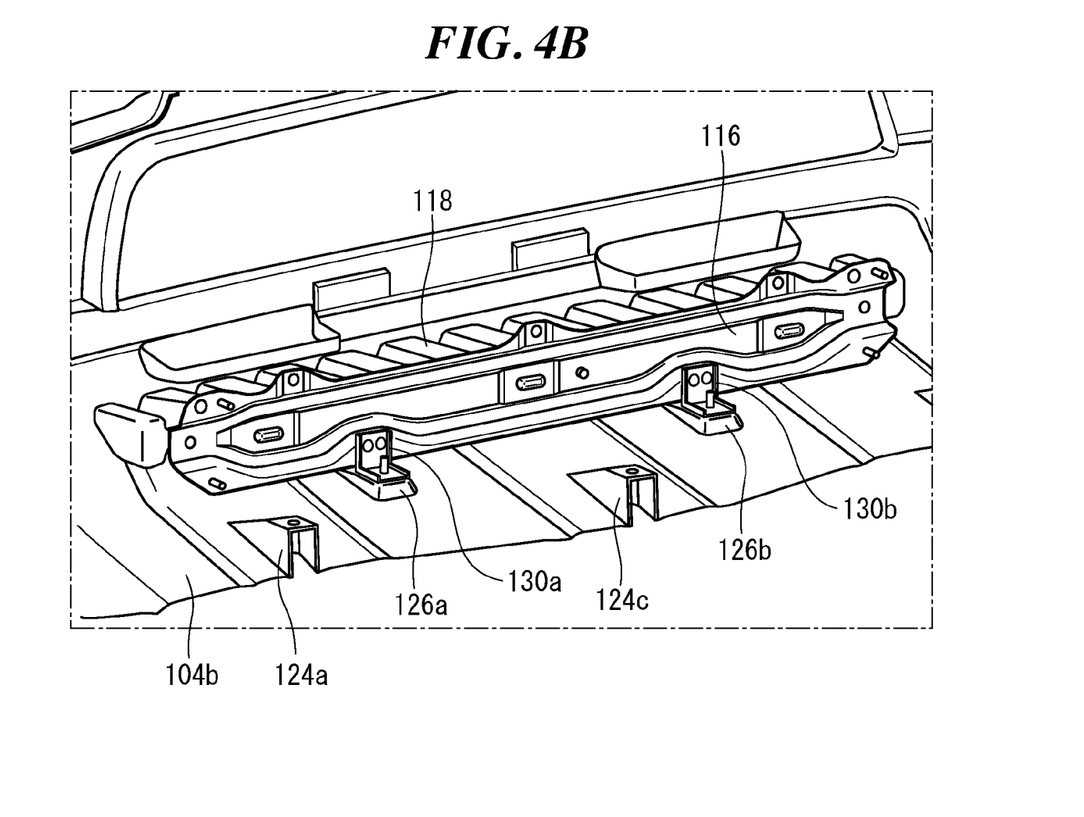

FIGS. 4A and 4B are diagrams showing part of the vehicle body front structure 100 shown in FIG. 1, as viewed from above on the vehicle rear side. FIG. 4A is a diagram showing the front bumper 102 and the cross member 120. FIG. 4B is a diagram showing the front bumper 102, the bumper member 116 and the absorber 118.

The bumper fascia 104 of the front bumper 102 has a bottom portion 104b extending toward the rear of the vehicle as shown in the drawings. The bottom portion 104b of the bumper fascia 104 includes three pedestals 124a, 124b and 124c formed side by side in the vehicle width direction (see FIG. 4A), and two pedestals 126a and 126b formed side by side in the vehicle width direction on the vehicle front side of the pedestals 124a, 124b and 124c (see FIG. 4B).

As shown in FIG. 4A, the pedestals 124a and 124b are connected to the rear side-cross member 120b via brackets 128a and 128b. The pedestal 124c is connected to the front side-cross member 120a via a bracket 128c. Thus, the front bumper 102 is connected to the cross member 120.

As shown in FIG. 4B, the pedestals 126a and 126b are connected to the bumper member 116 via brackets 130a and 130b. Thus, the front bumper 102 is connected to the bumper member 116. Note that the bumper member 116 holds the absorber 118 on the vehicle front side.

With reference to FIGS. 5A to 7, the following describes the behavior of the vehicle body front structure 100 in a case where a collision element 200 that resembles a pedestrian's leg collides with the vehicle body front structure 100 from the vehicle front side as indicated by the arrow B. Note that the present embodiment assumes that a pedestrian's leg facing the vehicle body collides with the vicinity of the center of the vehicle body, and thereby the front bumper 102 receives an impact load from the front. This case assumes, as a prerequisite, that the vehicle body collides with a pedestrian facing the vehicle body at a predetermined speed of about 20 to 40 km/h, for example.

Figure 5A:
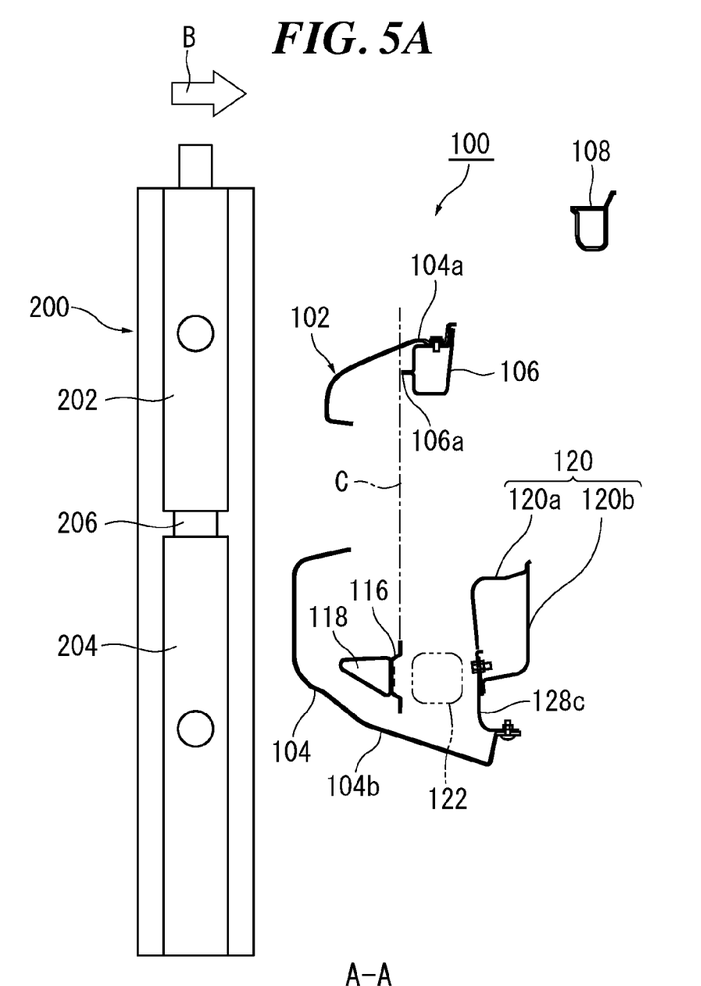
FIGS. 5A and 5B are cross-sectional views of the vehicle body front structure of FIG. 1 taken along the arrows A-A.
Figure 5B:
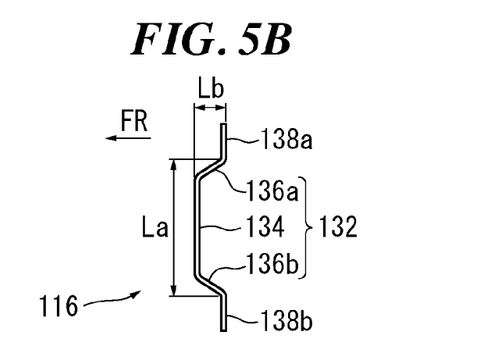

FIGS. 5A and 5B are cross-sectional views of the vehicle body front structure 100 shown in FIG. 1 taken along the arrows A-A. FIG. 5A is a diagram showing the cross-sectional view of the vehicle body front structure 100 taken along the arrows A-A, together with the collision element 200. FIG. 5B is an enlarged view of the bumper member 116 shown in FIG. 5A.

As shown in FIG. 5A, the collision element 200 includes an upper portion 202, a lower portion 204 and a knee joint portion 206. The upper portion 202 is a portion that resembles the thigh part of the pedestrian's leg. The position of the upper portion 202 corresponds to the position of the upper member 106. The lower portion 204 is a portion that resembles the crus part of the pedestrian's leg. The position of the lower portion 204 corresponds to the position of the bumper member 116 and the absorber 118. The knee joint portion 206 is a portion that resembles the knee joint portion of the pedestrian's leg.

The upper member 106 is a member disposed above the bumper member 116 and extending in the vehicle width direction, and its front end 106a is located, in a front-rear direction of the vehicle, slightly behind the bumper member 116 as indicated by the chain line C in FIG. 5A. Further, the above-described clearance 122 is located behind the bumper member 116.

As shown in FIG. 5B, the bumper member 116 has a shape that is open toward the rear of the vehicle, without its cross-sectional shape forming a closed section as viewed from the side. More specifically, the bumper member 116 forms a protrusion 132 protruding toward the front of the vehicle and extending across the vehicle width direction. The protrusion 132 has a vertical wall portion 134 located on the vehicle front side and sloped portions 136a and 136b. For example, the sloped portions 136a and 136b may extend continuously from the vertical wall portion 134 and be sloped toward the rear of the vehicle, on the vehicle upper side and the vehicle lower side, respectively.

As shown in the drawing, the protrusion 132 has a dimension La in the vehicle up-down direction that is larger than a dimension Lb in the vehicle front-rear direction. In other words, the protrusion 132 has a shape that is longer in the vehicle up-down direction than in the vehicle front-rear direction. Additionally, the bumper member 116 has flange portions 138a and 138b. The flange portions 138a and 138b extend continuously from the sloped portions 136a and 136b and project toward the vehicle upper side and the vehicle lower side, respectively.

Thus, the bumper member 116 forms the protrusion 132 having a shape that is longer in the vehicle up-down direction than in the vehicle front-rear direction, and is also open toward the rear of the vehicle without forming a closed section. Accordingly, the bumper member 116 has low rigidity against impacts in the vehicle front-rear direction and high rigidity against impacts in the vehicle up-down direction.

Figure 6:
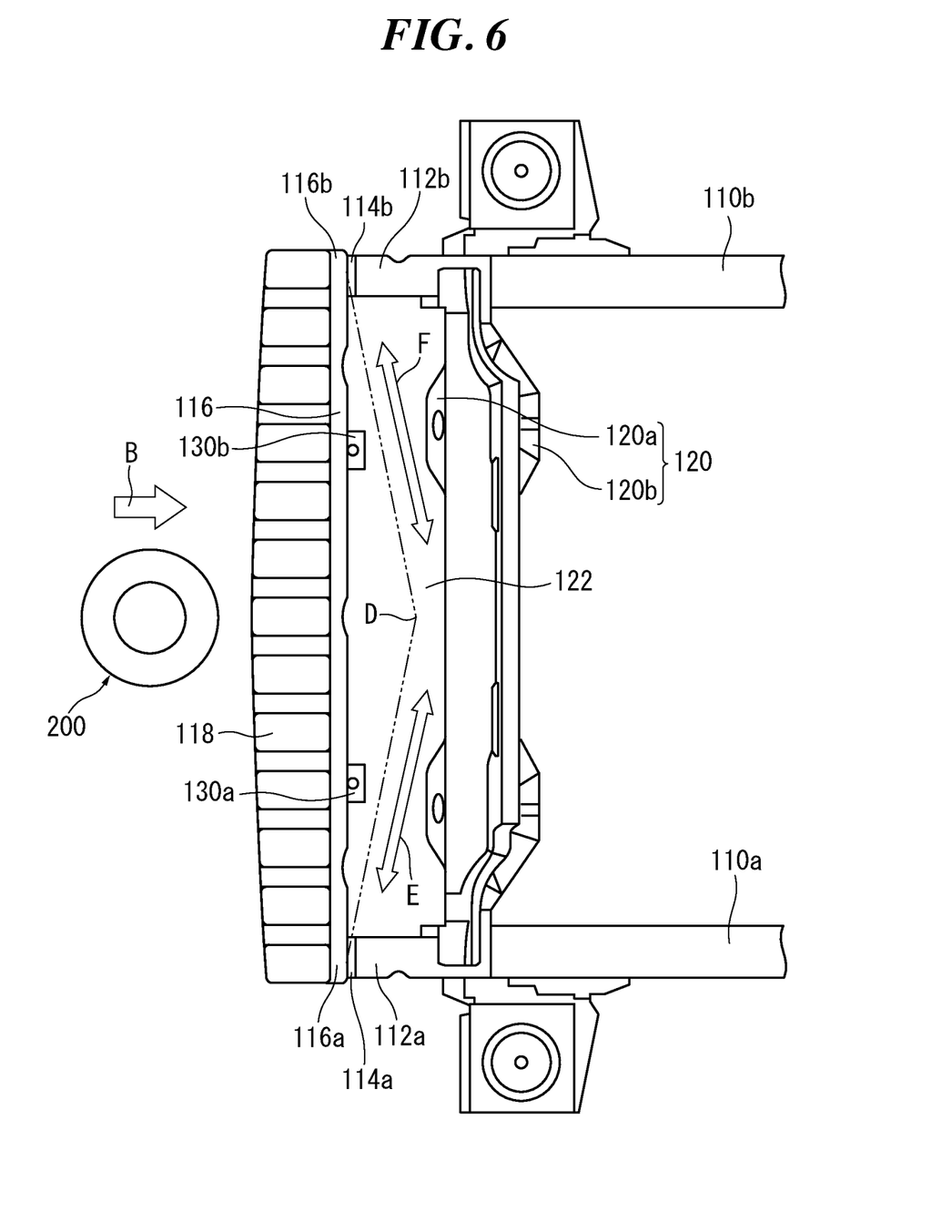
FIG. 6 is a top view showing part of the vehicle front structure shown in FIGS. 5A and 5B.
Figure 7:
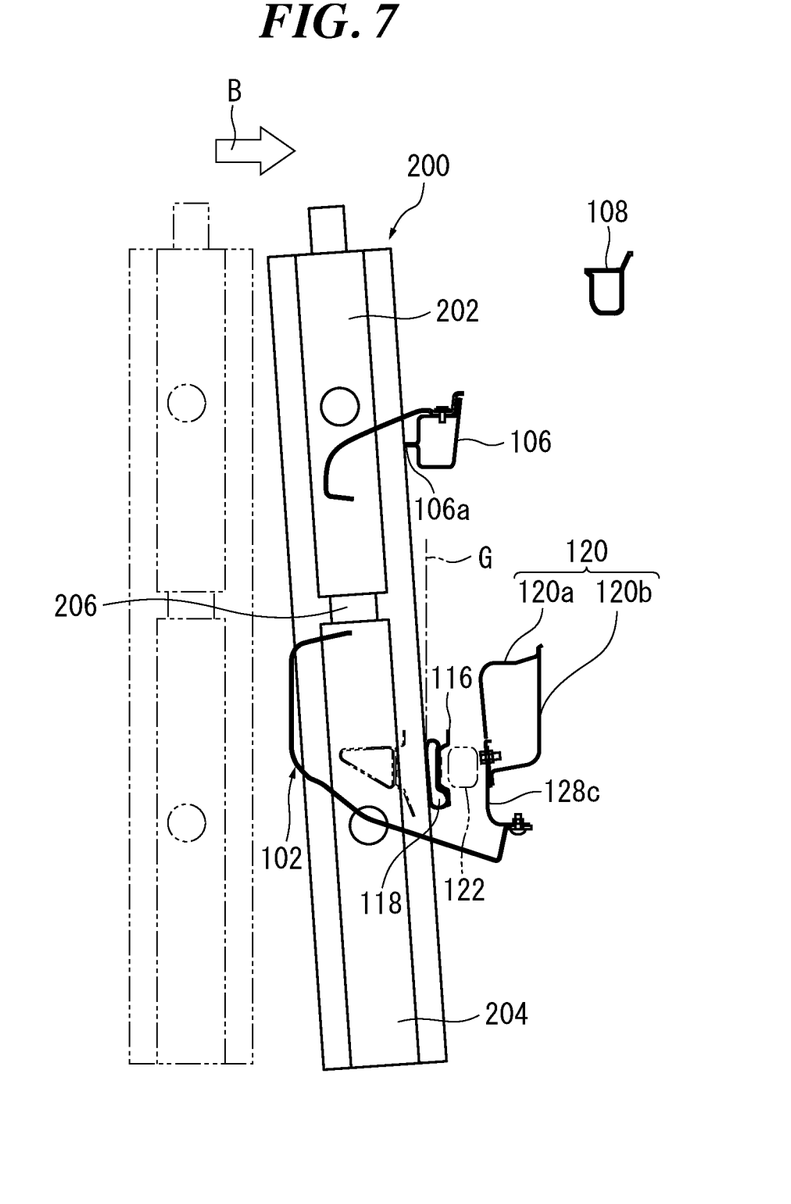
FIG. 7 is a diagram showing the vehicle front structure shown in FIGS. 5A and 5B, with a collision element having collided therewith.

FIG. 6 is a top view showing part of the vehicle body front structure 100 shown in FIG. 5. For the sake of convenience, illustration of the front bumper 102, the upper member 106 and the hood member 108 has been omitted from FIG. 6. FIG. 7 is a diagram showing a state in which the collision element 200 has collided with the vehicle body front structure 100 shown in FIG. 5. Note that the state before the collision of the collision element 200 is indicated in phantom in the drawing.

Upon collision of the collision element 200 from the front of the vehicle body as indicated by the arrow B, first, the bumper member 116, which has low rigidity against the impact in the vehicle front-rear direction, collapses in cross section and absorbs the collision energy. The clearance 122 is located behind the bumper member 116. Accordingly, the bumper member 116 is deformed such that its portion in the vicinity of the vehicle center is bent backward so as to approach the cross member 120 as indicated by the chain line D in FIG. 6. In other words, the presence of the clearance 122 allows the bumper member 116 to be deformed rearward.

Furthermore, both ends 116a and 116b of the bumper member 116 are connected to the side members 110a and 110b via the support members 114a and 114b and the crush cans 112a and 112b as described above. Accordingly, tensile force acts on the bumper member 116 in the vehicle width direction from the side members 110a and 110b connected to both end portions 116a and 116b as indicated by the arrows E and F. Thereby, the bumper member 116 absorbs the collision energy and completes its deformation as indicated by the chain line D.

Upon completion of deformation of the bumper member 116, the absorber 118 then collapses rearward. Thereby, the collision energy is further absorbed by the absorber 118. The position of the bumper member 116 and the absorber 118 that have been deformed so as to collapse rearward is located further to the rear of the vehicle than the front end 106a of the upper member 106 as indicated by the chain line G in FIG. 7.

Thus, as a result of the collision energy being absorbed due to deformation of the bumper member 116 and the absorber 118, the lower portion 204 of the collision element 200 travels toward the rear of the vehicle while decelerating. The upper portion 202 of the collision element 200 travels toward the rear of the vehicle until it comes into contact with the front end 106a of the upper member 106 by inertial force, for example. Note that it is assumed that the bumper member 116 does not come into contact with the cross member 120 when a pedestrian's leg collides with the vehicle body front structure 100 at a predetermined speed assumed in the present embodiment.

Then, the bumper member 116 and the absorber 118 absorb the collision energy while being deformed and retracting until they are located further to the rear of the vehicle than the front end 106a of the upper member 106. As a result, in the collision element 200, the lower portion 204 is located further to the rear of the vehicle than the upper portion 202 as shown in FIG. 7. This positional relationship makes it possible to reduce the impact on the knee joint portion 206 of the collision element 200, and thus a so-called optimum position relationship is achieved.

Meanwhile, in the case of the existing vehicle body front structures, the absorption of the collision energy and the reduction of damage to pedestrians have been attained by simply placing, inside a bumper fascia, a bumper member and an absorber disposed in front of the bumper member and causing the absorber to collapse upon collision with the pedestrian's leg.

Further, vehicle body front structures are required to be more compact in order to ensure the cabin space and the luggage compartment capacity of the vehicle body. At the same time, vehicle body front structure are also required to have a configuration in which a pair of solid side members are further elongated in the vehicle front-rear direction in order to protect passengers in the event of collisions. If these requirements are to be taken into consideration, it is difficult to ensure a clearance between the bumper fascia and the bumper member for placement of the absorber, for example, so that a vehicle body front structure may not be possible to sufficiently absorb the collision energy.

Furthermore, the protection of the pedestrian's leg requires a reduction of loads, such as shear and bending loads, on the knee joint portion of the pedestrian's legs. Therefore, how the energy of a collision from the front of the vehicle is received at the front end of the vehicle body is critical to the vehicle body front structure. However, in the case of the existing vehicle body front structures, how the collision energy is received may depend on the layout of the members (vehicle body structures) disposed at the front end of the vehicle body. Moreover, since the layout of the vehicle body structures significantly contributes to the design of the vehicle body or the passenger protection in the event of collisions, there may be cases where a layout unfavorable in terms of the protection of the pedestrian's leg is adopted.

In contrast, in the case of the vehicle body front structure 100 according to this embodiment, as described above, the bumper member 116 holding the absorber 118 is open toward the rear of the vehicle without forming a closed section. Furthermore, the clearance 122 is located behind the bumper member 116. Accordingly, with the vehicle body front structure 100, the bumper member 116 is actively deformed to absorb the collision energy. Upon completion of this deformation, the absorber 118 subsequently collapses and can further absorb the collision energy while retracting.

As a result, the vehicle body front structure 100 presents an optimum positional relationship in which the bumper member 116 and the absorber 118 are located to the rear of the vehicle, relative to the front end 106a of the upper member 106. That is, in the collision element 200, the lower portion 204 is located further to the rear of the vehicle than the upper portion 202 as shown in FIG. 7. This positional relationship makes it possible to reduce the impact on the knee joint portion 206 of the collision element 200. Accordingly, the vehicle body front structure 100 can reduce loads, such as shear and bending, on the knee joint portion of the pedestrian's leg and achieve an enhanced performance in protection of the pedestrian's leg.

Note that the vehicle body front structure 100 can achieve an enhanced performance in protection of the pedestrian's leg by actively deforming the bumper member 116 and retracting the bumper member 116 and the absorber 118 to optimum positions. Accordingly, even if a vehicle has a layout of the vehicle body structure that is unfavorable in terms of protection of the pedestrian's leg, the pedestrian protection performance can be enhanced by application of the vehicle body front structure 100.

Although the bumper member 116 is a member made of metal in the above-described embodiment, the present invention is not limited thereto, and the bumper member 116 may be formed of any suitable material such as resin as long as the material is resistant to cracking in the event of collisions and has high strength against the force input in a direction in which it is pulled.

While a preferred embodiment of the present invention has been described above with reference to the accompanying drawings, it should be appreciated that the present invention is not limited to the embodiment shown above. It will be apparent for a person skilled in the art that various modifications and variations may be made within the scope of the invention as defined in the appended claims, and those modifications and variations should be understood to be included within the technical scope of the present invention.

The present invention is applicable to a vehicle body front structure including a front bumper installed at the front end of the body of a vehicle.

The invention claimed is:

1. A vehicle body front structure comprising:
   a front bumper installed at a front end of a body of a vehicle;
   a pair of side members disposed behind the front bumper spaced apart in a width direction of the vehicle and extending in a front-rear direction of the vehicle;
   a bumper member extending in the width direction of the vehicle and connected at both ends thereof to front ends of the pair of side members;
   a clearance behind the bumper member;
   an absorber disposed in front of the bumper member and extending in the width direction of the vehicle, the absorber being configured to absorb an impact from the front of the vehicle; and
   an upper member disposed above the bumper member and extending in the width direction of the vehicle, a front end of the upper member being located, in the front-rear direction of the vehicle, slightly behind the bumper member;
   wherein the bumper member is formed of a single plate and forms a protrusion protruding toward the front of the vehicle and extending across the width direction of the vehicle, the protrusion having a shape that is longer in an up-down direction of the vehicle than in the front-rear direction of the vehicle.

* * * * *